(12) United States Patent
Buskop

(10) Patent No.: US 7,598,928 B1
(45) Date of Patent: Oct. 6, 2009

(54) VIDEO DISPLAY HAT

(76) Inventor: Jacqueline Evynn Breuninger Buskop, 2241 Del Monte Dr., Houston, TX (US) 77019

( * ) Notice: Subject to any disclaimer, the term of this patent is extended or adjusted under 35 U.S.C. 154(b) by 957 days.

(21) Appl. No.: 11/014,659

(22) Filed: Dec. 16, 2004

(51) Int. Cl.
*G09G 5/00* (2006.01)
(52) U.S. Cl. ..................................... 345/8; 345/7; 345/9
(58) Field of Classification Search .................. 345/2.1, 345/2.3, 7–9; 349/11, 13; 348/51–53, 113–115; 359/13, 630–632
See application file for complete search history.

(56) References Cited

U.S. PATENT DOCUMENTS 6,157,291 A * 12/2000 Kuenster et al. ................ 345/8
6,606,114 B1 * 8/2003 Gordon et al. ................ 348/64
6,847,336 B1 * 1/2005 Lemelson et al. .............. 345/8

* cited by examiner

*Primary Examiner*—Richard Hjerpe
*Assistant Examiner*—Mansour M Said
(74) *Attorney, Agent, or Firm*—Buskop Law Group, PC; Wendy Buskop

(57) ABSTRACT

A hat for a displaying video signals having, a hat, a fuel cell operated video display mounted as an integral structural component of the hat, a fuel cell operated video camera having a blue tooth wireless connection to the video display and removably mounted to the hat, and wherein the video camera captures images in the direction of an indication of the hat.

18 Claims, 5 Drawing Sheets

VIDEO DISPLAY HAT

FIELD OF INVENTION

Embodiments of the invention relate to a hat with a video display and a video camera.

BACKGROUND

The instant invention relates generally to hats worn by Tour Guides. Tour Guides often are wearing hats while giving tours to visitors. These hats are often theme hats and add to the tour experience by placing the tour visitor in the mind set for the tour.

The problems that occur with many of the hats are that the size of the hat inhibits the tour visitors view of the surroundings. Additionally, since the hats often attract attention from the tour visitors, this is an opportunity to advertise. However, currently, there is only a limited amount of space on a hat for advertisements without destroying the theme of the hat.

Cameras and video displays are often used on tours but these devices are not portable. Thus, if the tour moves from a place where a video display and camera can be permanently mounted to a place where a video display and camera cannot, then the tour visitors lose the enhanced tour experience provided by the video display.

The present invention solves the problem of the hat blocking the view of the tour visitors.

The present invention solves the problem of the limited advertising space buy the ability to change the advertisement.

The present invention solves the problem of present devices limited mobility.

BRIEF DESCRIPTION OF THE DRAWINGS

Aspects of the present invention will be described in greater detail with reference to the appended figures.

DETAILED DESCRIPTION

This is a description of a preferred embodiment of the device. The device is not limited to the descriptions in the application and includes embodiments not described in the application.

The current invention is for capturing and displaying video signals on hats. The device will solve the problem of the view around the hat of a tour guide and also allow the capturing and displaying devices to be mobile. The device will also allow for the displaying of advisements, warnings, prompts, such as "applause" on the video display when used in a TV studio, or any other video signal.

An embodiment of the invention is a device for a displaying video signals on a hat having a hat, a video display mounted to the hat, a video camera connected to the video display and mounted to the hat, and where the video camera captures images in the direction the wearer of the hat is facing.

In another embodiment, the device can have an adjustment for enhancing the video display image.

In still another embodiment, the device can have a power supply connected to the video display, and the video camera. The power supply is at least one battery, fuel cell, a solar panel, or other suitable power supplies.

Figure 1:
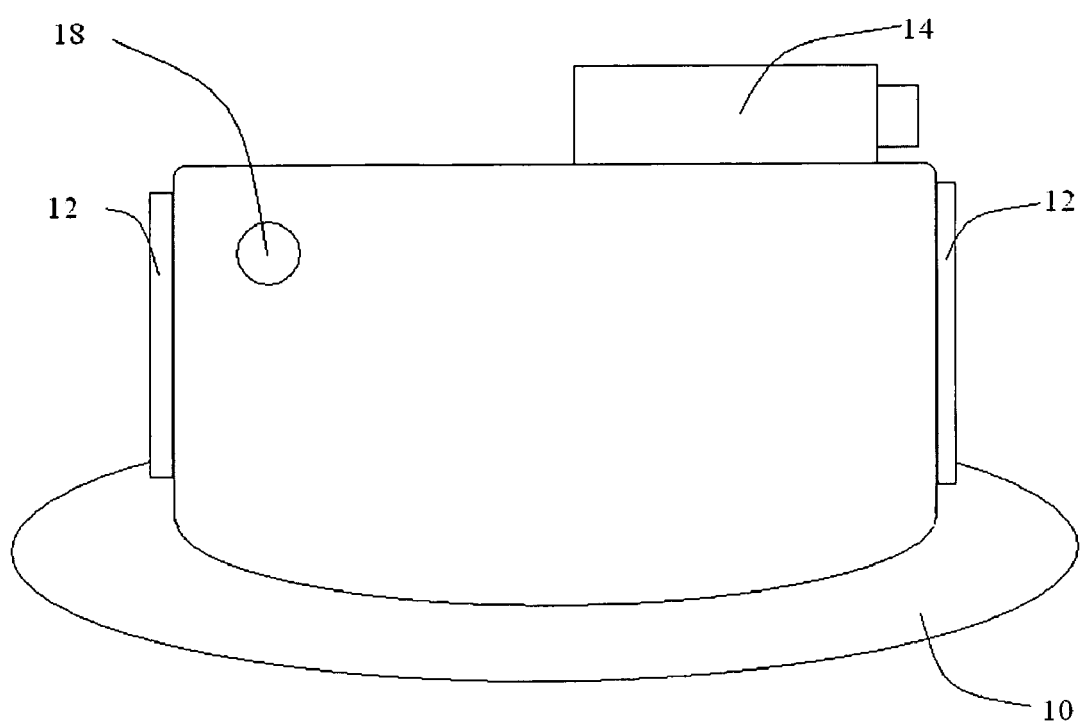
FIG. 1 depicts a side view of the video hat.

Referring to the figures, FIG. 1 depicts a device for a displaying video signals on a hat having, a hat 10, a fuel cell operated video display 12 mounted to the hat, a fuel cell operated video camera 14 having a blue tooth connection to the video display and mounted to the hat, and wherein the video camera captures images in the direction of the wearer of the hat is facing (not depicted in FIG. 1). The video display can be an LCD panel, or plasma panel. FIG. 1 further depicts a remote focus adjustment device 18 wirelessly connected to the video image display, for improving the video display image. The fuel cell can also be a battery, solar cell, or another power source.

Figure 2:
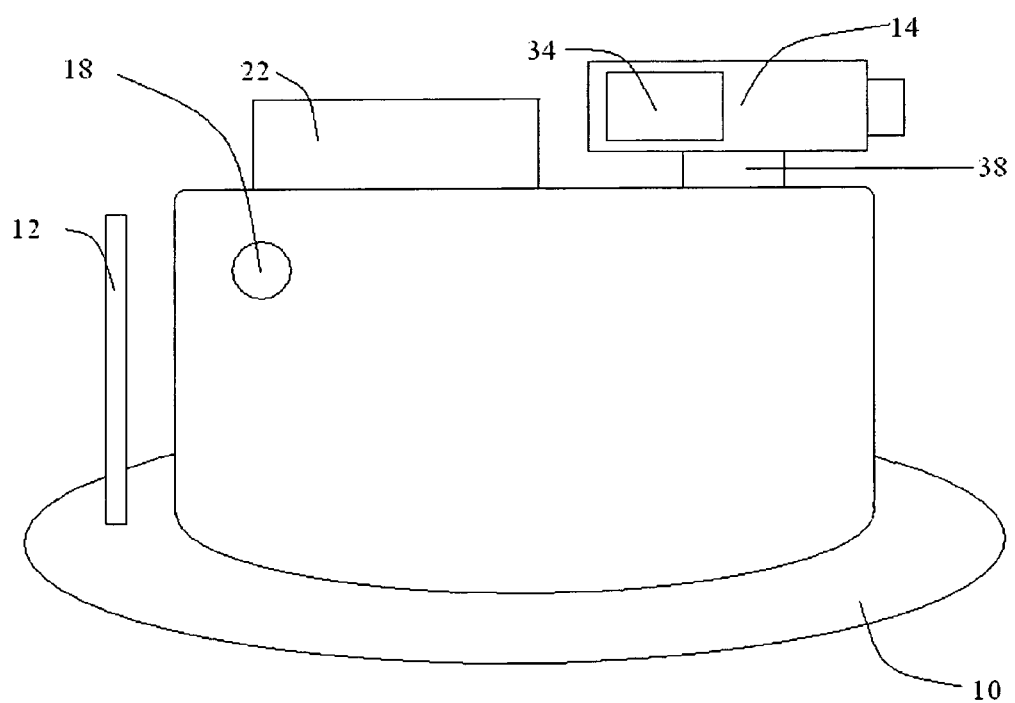
FIG. 2 depicts another preferred embodiment of the video hat.

FIG. 2 depicts, a fuel cell 22 connected to the video display 12, and the video camera 14. The fuel cell 22 can be a battery, a solar cell or another small portable power source. The video camera can record onto a media 34 for future play back. The media can be, recordable CD, recordable DVD, flash memory, video tape, or other compatible storage media. FIG. 2, further depicts a camera moving base 38 attached to the hat 10 and the video camera 14 is attached to the camera moving base 38, for changing the direction of where the video camera is aimed. A processing unit (not shown) can be connected to the camera moving base, and the power supply the display moving base, the sensor or a combinations thereof. The camera moving base will assisting in keeping the image captured by the camera steady during quick movements of the wearer head.

Figure 3:
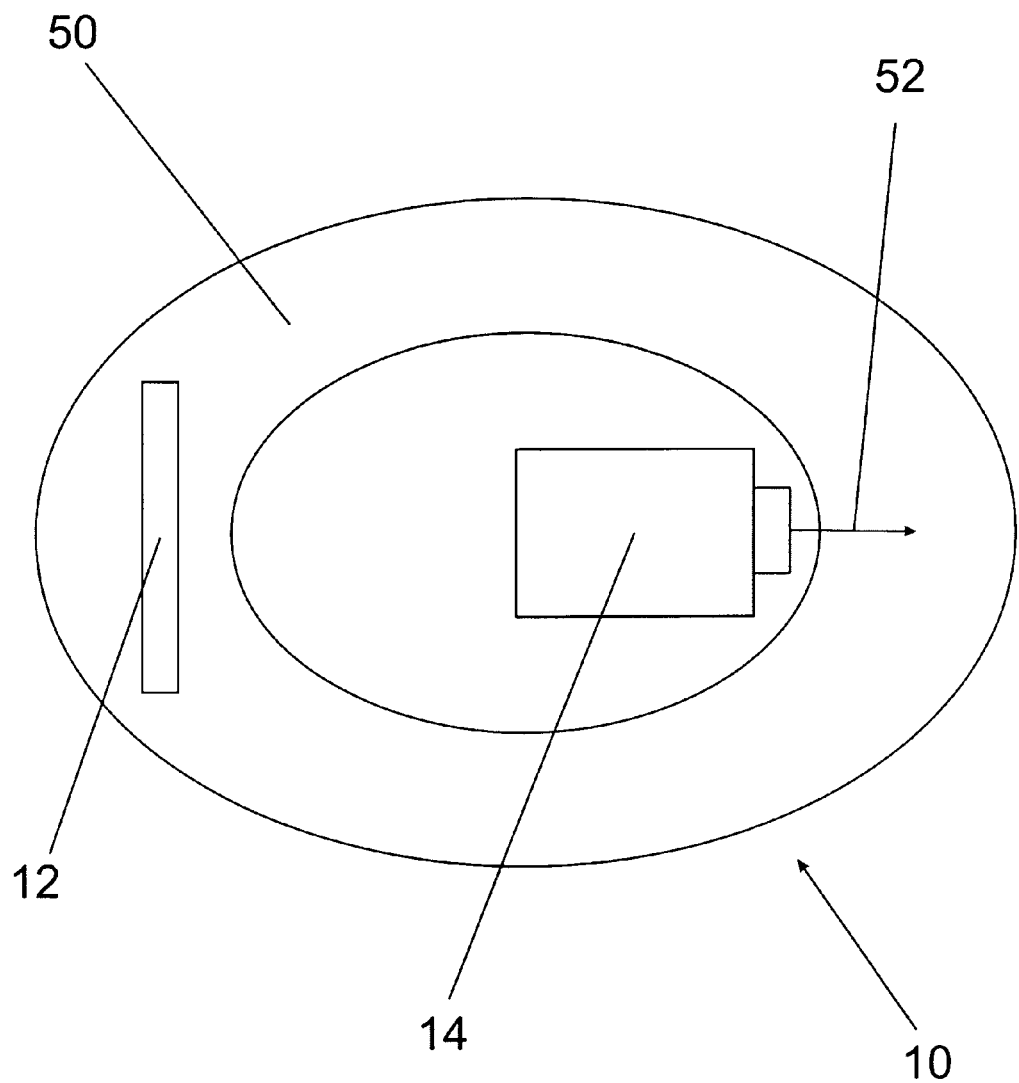
FIG. 3 depicts a top view of the video hat.

FIG. 3 depicts, a top view of the video hat 10 showing the video display 12, the video camera 14. In this embodiment the hat 10 has a brim 50. The video display 12 is mounted on the brim of the hat with the display positioned to give the display the widest angle of viewability to allow the maximum number of viewers to view the display, such as tour visitors when the wearer of the hat turns their head away from the tour visitors.

Figure 4:
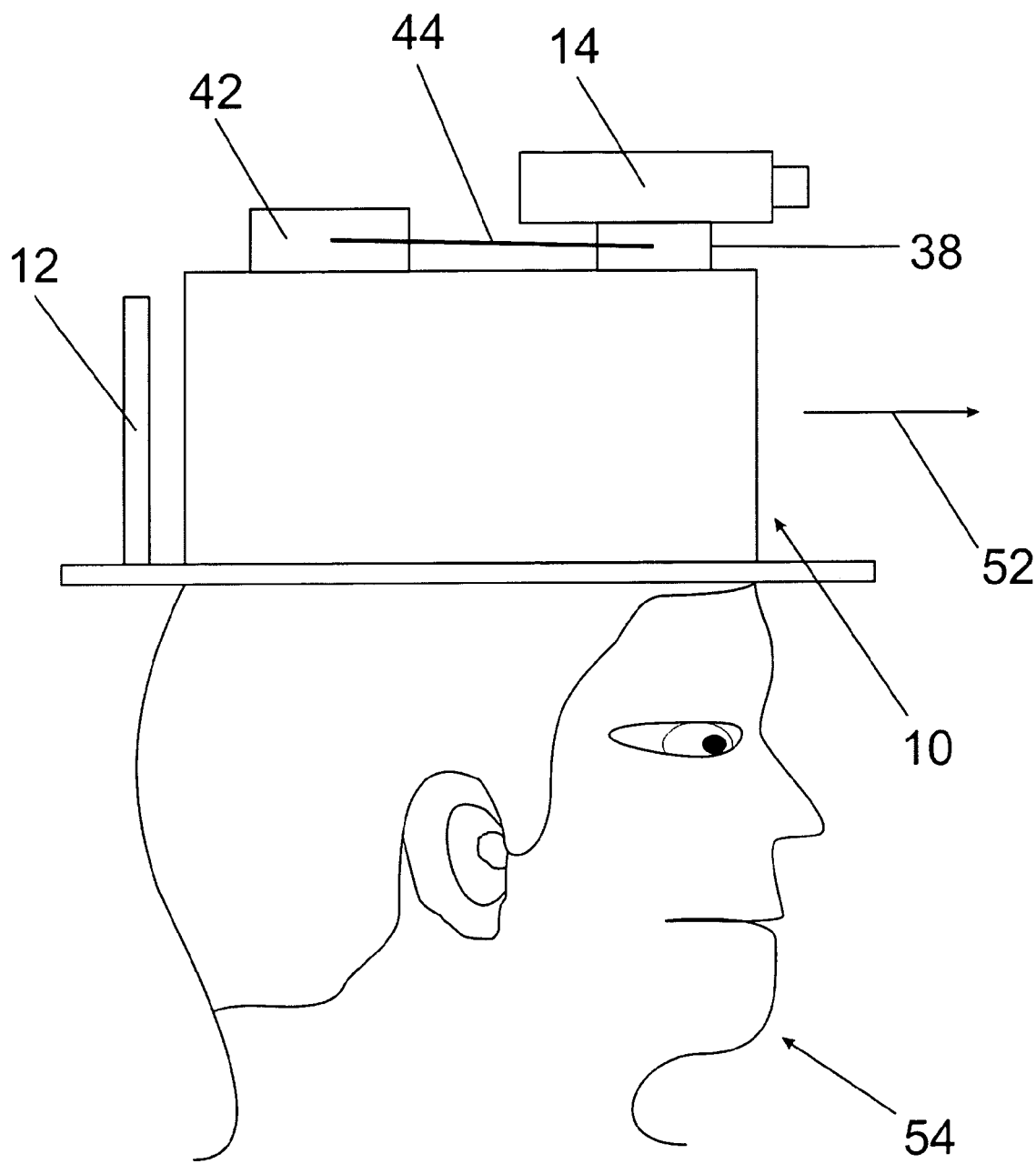
FIG. 4 depicts another preferred embodiment with a processing unit connected to the video hat.

FIG. 4 depicts an embodiment that has a hat 10 shown on a wearer 54 of the hat 10. The direction of the camera is depicted by arrow 52. The moving base (38) can change the direction of the video camera (14) according to (52). The moving base is controlled by the processing unit (42). The video display (12) is mounted to the hat (10).

Figure 5:
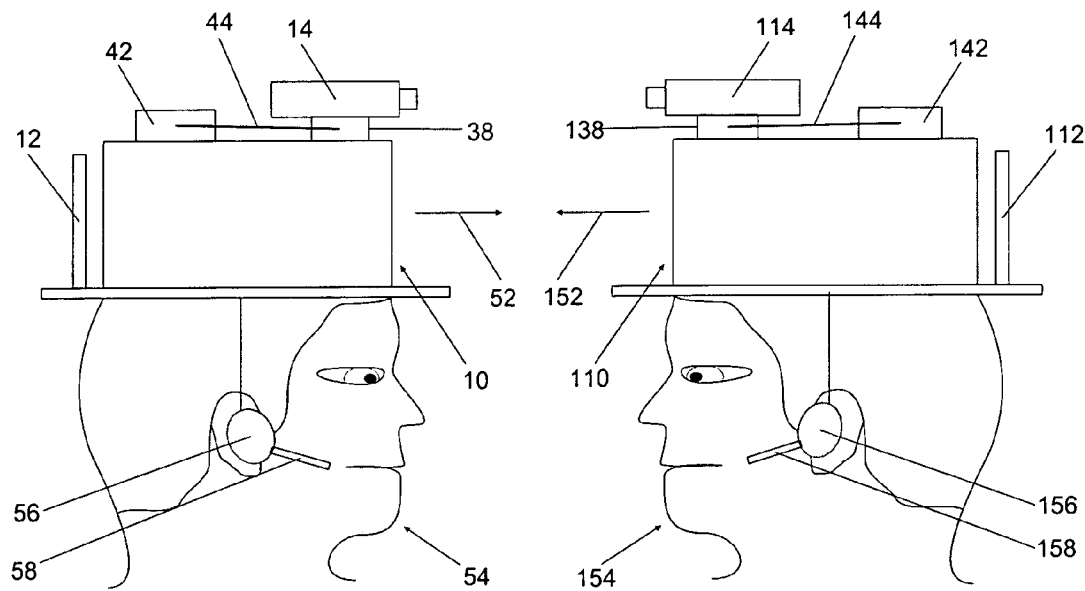
FIG. 5 depicts an embodiment with two hats communicating.

FIG. 5 depicts an embodiment with a first hat (10) and a second hat (110). Each hat (10) and (110) have a speaker (56) and (156) and a microphone (58) and (158). The speaker (56) and the microphone (58) are connected to the speaker (156) and the microphone (158) of the second hat (110) so that the wearer (54) of the first hat (10) can communicate wirelessly with a wearer (154) of the second hat (110). The first hat also can have a wireless connection to the second hat allowing the first hat to control the video camera and the video display of another hat. The speakers and the microphones FIG. 5 also depicts the first video display (12) and the second video display (112). The first and the second video cameras (14) and (114) are also shown on the first and second moving bases (38) and (138). The first and second moving bases (38) and (138) are connected to the first and the second processing units (42) and (142) via the first and the second connection (44) and (144). The processing unit and the moving base will help kept the image captured by the video cameras pointed in the direction indicated by arrow (52) and (152).

Additionally, the video display can decode a signal from the video camera, or display a signal from an outside source, such as a remote transmission. The video display and the video camera communicate a signal from the video camera to the video display by a cable or wirelessly. The outside source can be a computer, a television station, or another video signal source. The preferred use of the outside signal source would be for displaying commercials to tour visitors. The outside source can be controlled by the person wearing the hat or another person.

This is a description of a preferred embodiment of the device. The device is not limited to the descriptions in the application and includes embodiments not described in the application.

What is claimed is:

1. A hat for a displaying video signals comprising:
   a. a hat with a hat top and a brim;
   b. a fuel cell operated video display mounted as an integral structural component of the hat;
   c. a fuel cell operated video camera having a blue tooth wireless connection to the fuel cell operated video display and removably mounted to the hat;
   d. wherein the fuel cell operated video camera captures images in the direction of an indication of the hat; and
   e. wherein the fuel cell operated video display is an LCD panel or plasma panel and the LCD panel or plasma panel is located on the hat top above the brim of the hat, and displays video signals in a direction opposite a wearer of the hat, for viewing by at least one viewer, wherein the at least one viewer is not the wearer of the hat.

2. The hat of claim 1 further comprising, a remote focus adjustment device connected to the video image display for improving the fuel cell operated video display image.

3. The hat of claim 1 wherein, the fuel cell is at least one battery, a solar cell, or combination thereof.

4. The hat of claim 1 wherein, the fuel cell operated video display additionally receives a signal from an outside source.

5. The hat of claim 4 wherein, the outside source is a computer, a broad cast station, or another video signal.

6. The hat of claim 1 wherein, the fuel cell operated video camera can record onto media for future play back.

7. The hat of claim 6 wherein, the media is selected from the group consisting of: read-writeable CD, recordable CD, recordable DVD, read-writeable DVD, mini-CD, flash memory, video tape, or combinations thereof.

8. The hat of claim 1 further comprising, a camera moving base attached to the hat and the fuel cell operated video camera is attached to the moving base, for changing the direction of where the camera is aimed.

9. The hat of claim 1, wherein the hat uses a smart card with biometric security to keep the hat from being used by an unauthorized user.

10. A hat for a displaying video signals comprising:
    a. a hat with a hat top and a brim;
    b. a video display connected to the hat;
    c. a video camera connected to the video display and wherein the video camera is connected to the hat;
    d. wherein the video camera captures images in the direction of an indication of the hat; and
    e. wherein the fuel cell operated video display is an LCD panel or plasma panel and the LCD panel or plasma panel is located on the hat top above the brim of the hat, and displays video signals in a direction opposite a wearer of the hat, for viewing by at least one viewer, wherein the at least one viewer is not the wearer of the hat.

11. The hat of claim 10 further comprising, a remote focus adjustment device connected to the video display for improving an image.

12. The hat of claim 10 further comprising, a power source connected to the video display and the video camera, wherein the power source is at least one battery, a solar cell, a fuel cell or combination thereof.

13. The hat of claim 10 wherein, the video display additionally receives a signal from an outside source.

14. The hat of claim 13 wherein, the outside source is a computer, a broad cast station, another video signal or combinations thereof.

15. The hat of claim 10 wherein, the fuel cell operated video camera can record onto media for future play back.

16. The hat of claim 15 wherein, the media is selected from the group consisting of: recordable CD, recordable DVD, a hard drive, flash memory, video tape, or combinations thereof.

17. The hat of claim 10 further comprising a camera moving base attached to the hat and the fuel cell operated video camera is attached to the moving base, for changing the direction of where the camera is aimed.

18. The hat of claim 10, where the hat uses a smart card with biometric security to keep the hat from being used by an unauthorized user.

* * * * *